United States Patent
McCarthy et al.

(10) Patent No.: US 10,951,861 B2
(45) Date of Patent: Mar. 16, 2021

(54) SYSTEMS AND METHODS TO ORDER A CONTENT ITEM DELIVERABLE VIA A MEDIA SERVICE

(71) Applicant: AT&T INTELLECTUAL PROPERTY I, L.P., Atlanta, GA (US)

(72) Inventors: Mary McCarthy, Frisco, TX (US); Glinda Irving, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 95 days.

(21) Appl. No.: 15/799,239

(22) Filed: Oct. 31, 2017

(65) Prior Publication Data

US 2018/0070055 A1 Mar. 8, 2018

Related U.S. Application Data

(63) Continuation of application No. 14/644,454, filed on Mar. 11, 2015, now Pat. No. 9,838,648, which is a
(Continued)

(51) Int. Cl.
*H04N 7/173* (2011.01)
*H04H 20/30* (2008.01)
(Continued)

(52) U.S. Cl.
CPC ....... *H04N 7/17318* (2013.01); *G06Q 20/123* (2013.01); *G06Q 20/3223* (2013.01); *G06Q 30/04* (2013.01); *G06Q 30/0603* (2013.01); *H04H 20/30* (2013.01); *H04H 20/57* (2013.01); *H04N 21/2225* (2013.01); *H04N 21/25* (2013.01); *H04N 21/251* (2013.01); *H04N 21/2543* (2013.01); *H04N 21/25891* (2013.01);
(Continued)

(58) Field of Classification Search
None
See application file for complete search history.

(56) References Cited

U.S. PATENT DOCUMENTS 6,314,296 B1 11/2001 Hamada et al.
6,741,684 B2 5/2004 Kaars
(Continued)

OTHER PUBLICATIONS

"Pay-Per-View by SMS," Textually.org, Jun. 30, 2003, retrieved Jun. 17, 2009, http://www.textually.org/textually/archives/2003/06/000978.htm, 1 page.
(Continued)

*Primary Examiner* — Justin E Shepard
(74) *Attorney, Agent, or Firm* — Guntin & Gust, PLC; John G. Rauch

(57) ABSTRACT

A method includes receiving, at a first device from a server via a first network associated with a wireless service, an offer for a content item that is deliverable via a multimedia service to a second device distinct from the first device. The offer is based on a characteristic of use of the second device. The method includes receiving, at the first device, input indicating acceptance of the offer. The method also includes sending, from the first device to the server via the wireless service, information indicating acceptance of the offer responsive to the input. Based on the information, the server is configured to send the content item to the second device.

20 Claims, 10 Drawing Sheets

Related U.S. Application Data continuation of application No. 12/507,208, filed on Jul. 22, 2009, now Pat. No. 9,137,494.

(51) Int. Cl.

| | | |
|---|---|---|
| *H04H 20/57* | (2008.01) | |
| *H04N 21/61* | (2011.01) | |
| *G06Q 20/12* | (2012.01) | |
| *G06Q 20/32* | (2012.01) | |
| *G06Q 30/04* | (2012.01) | |
| *G06Q 30/06* | (2012.01) | |
| *H04N 21/2225* | (2011.01) | |
| *H04N 21/2543* | (2011.01) | |
| *H04N 21/414* | (2011.01) | |
| *H04N 21/472* | (2011.01) | |
| *H04N 21/658* | (2011.01) | |
| *H04N 21/426* | (2011.01) | |
| *H04N 21/47* | (2011.01) | |
| *H04N 21/41* | (2011.01) | |
| *H04N 21/65* | (2011.01) | |
| *H04N 21/25* | (2011.01) | |
| *H04N 21/258* | (2011.01) | |
| *H04N 21/478* | (2011.01) | |
| *H04N 21/81* | (2011.01) | |
| *H04N 21/858* | (2011.01) | |

(52) U.S. Cl.
CPC ....... *H04N 21/41* (2013.01); *H04N 21/41407* (2013.01); *H04N 21/426* (2013.01); *H04N 21/47* (2013.01); *H04N 21/47202* (2013.01); *H04N 21/47211* (2013.01); *H04N 21/47815* (2013.01); *H04N 21/6131* (2013.01); *H04N 21/65* (2013.01); *H04N 21/6581* (2013.01); *H04N 21/812* (2013.01); *H04N 21/8186* (2013.01); *H04N 21/8586* (2013.01)

(56) References Cited

U.S. PATENT DOCUMENTS

| | | | |
|---|---|---|---|
| 6,782,253 B1 | 8/2004 | Shteyn et al. | |
| 7,054,612 B2 | 5/2006 | Patel | |
| 7,222,154 B2 | 5/2007 | Dowling | |
| 7,292,588 B2 | 11/2007 | Milley et al. | |
| 7,450,960 B2 | 11/2008 | Chen | |
| 8,099,325 B2 | 1/2012 | Gangadharpalli et al. | |
| 8,559,795 B2 | 10/2013 | Wachtfogel et al. | |
| 8,712,395 B2 | 4/2014 | Ramer et al. | |
| 8,738,437 B2 | 5/2014 | Gailey et al. | |
| 2003/0005448 A1 | 1/2003 | Axelsson et al. | |
| 2003/0088872 A1 | 5/2003 | Maissel et al. | |
| 2003/0149978 A1 | 8/2003 | Plotnick | |
| 2003/0233451 A1* | 12/2003 | Ludvig | H04N 21/2221 709/225 |
| 2005/0130585 A1 | 6/2005 | Gnuschke et al. | |
| 2005/0289589 A1 | 12/2005 | Vermola | |
| 2005/0289591 A1 | 12/2005 | Vermola et al. | |
| 2005/0289592 A1 | 12/2005 | Vermola | |
| 2006/0101492 A1 | 5/2006 | Lowcock | |
| 2006/0141988 A1 | 6/2006 | Wendling | |
| 2006/0218226 A1* | 9/2006 | Johnson | H04L 67/16 709/202 |
| 2006/0225108 A1 | 10/2006 | Tabassi et al. | |
| 2006/0258399 A1 | 11/2006 | Liebowitz et al. | |
| 2006/0282856 A1* | 12/2006 | Errico | G06Q 30/02 725/46 |
| 2006/0288374 A1 | 12/2006 | Ferris et al. | |
| 2007/0044127 A1 | 2/2007 | Vaysman et al. | |
| 2007/0107021 A1 | 5/2007 | Angel et al. | |
| 2007/0220565 A1 | 9/2007 | Angel et al. | |
| 2007/0299736 A1 | 12/2007 | Perrochon et al. | |
| 2008/0046912 A1 | 2/2008 | Gemelos et al. | |
| 2008/0114694 A1 | 5/2008 | Hamdane et al. | |
| 2008/0127254 A1 | 5/2008 | Nakajima | |
| 2008/0127255 A1* | 5/2008 | Ress | H04N 7/17318 725/38 |
| 2008/0139112 A1* | 6/2008 | Sampath | H04L 67/20 455/3.04 |
| 2008/0148320 A1* | 6/2008 | Howcroft | H04N 5/44513 725/61 |
| 2008/0172292 A1 | 7/2008 | Hurowitz et al. | |
| 2008/0298268 A1* | 12/2008 | Chiba | H04H 60/27 370/252 |
| 2008/0300983 A1 | 12/2008 | Chen et al. | |
| 2009/0094160 A1* | 4/2009 | Webster | G06Q 30/02 705/51 |
| 2009/0128335 A1* | 5/2009 | Leung | G06Q 30/02 340/572.1 |
| 2009/0164325 A1 | 6/2009 | Bishop et al. | |
| 2009/0216651 A1* | 8/2009 | Ghafoor | G06Q 20/204 705/17 |
| 2009/0241180 A1* | 9/2009 | Fiatal | H04L 63/10 726/12 |
| 2010/0048226 A1 | 2/2010 | Owen et al. | |
| 2010/0064307 A1 | 5/2010 | Malhotra et al. | |
| 2010/0119208 A1 | 5/2010 | Davis et al. | |
| 2010/0185489 A1 | 7/2010 | Satyavolu et al. | |
| 2010/0241699 A1 | 9/2010 | Muthukumarasamy et al. | |
| 2010/0311399 A1 | 12/2010 | Cusick et al. | |
| 2012/0190386 A1 | 7/2012 | Anderson | |

OTHER PUBLICATIONS

Deutsch, "SMS Meets Pay-Per-View: Ask Your Phone What to Watch", Deutsch, J., "SMS Meets Pay-Per-View: Ask Your Phone What to Watch," NDS World Vision, Issue 21, Feb. 2004, 3 pages.

Stensgaard, "Showtime Launches SSM Text Service for Ordering Home Cinema Pay-Per-View Movies", Stensgaard, A-B., "Showtime Launches SMS Text Service for Ordering Home Cinema Pay-Per-View Movies," AME Info, Nov. 23, 2003, updated Oct. 27, 2006, 2 pages.

* cited by examiner

SYSTEMS AND METHODS TO ORDER A CONTENT ITEM DELIVERABLE VIA A MEDIA SERVICE

CROSS-REFERENCE TO RELATED APPLICATION

This application claims priority from, and is a continuation of, U.S. patent application Ser. No. 14/644,454, filed on Mar. 11, 2015, which is a continuation of U.S. patent application Ser. No. 12/507,208, filed on Jul. 22, 2009, now U.S. Pat. No. 9,137,494, each of which is incorporated herein in its entirety.

FIELD OF THE DISCLOSURE

The present disclosure is generally related to ordering content items that are deliverable via a television service.

BACKGROUND

As wireless device usage becomes more common, value can be provided to consumers of various services by integrating the management of the various services with a consumer's wireless device. One particular consumer service that can benefit from integration with a consumer's wireless device is a television service, such as a cable television service, a satellite television service, or an Internet Protocol television (IPTV) service. Television service subscribers can request the delivery of specific media content that is deliverable via the television service, such as on-demand movies, pay-per-view events, and other media content. Television service subscribers often learn that a particular content item is available while watching television. For example, the subscriber may view a commercial for the particular content item or may notice the particular content item while using a programming guide. If the subscriber wishes to order the particular content item, the subscriber typically must do so from the television, for example, via the programming guide.

DETAILED DESCRIPTION

Systems and methods for ordering a content item that is deliverable via a television service are disclosed. The disclosed systems and methods may enable a provider of television programming content to offer the television programming content to a consumer via a mobile device associated with the consumer. The offered television programming content may be consistent with the consumer's television viewing patterns and television viewing preferences. Consumers may also be provided with a multimedia preview of the offered television programming content. The disclosed systems and methods may also enable the consumer to order the television programming content via the consumer's mobile device. The consumer can place an order for the television programming content simply by replying to the offer that was delivered to the consumer's mobile device. A confirmation message may be sent to the consumer once the order has been placed. A reminder message may be sent to the consumer prior to the time at which the television programming content will be available for viewing.

In a first particular embodiment, a system includes an order processing module that receives an order for a content item that is deliverable via a television service associated with a user. The order is issued in response to an acceptance by the user of an offer for the content item. The offer for the content item is communicated via an offer message that is sent to a mobile device associated with the user. The system also includes a content delivery module that initiates delivery of the content item via the television service.

In a second particular embodiment, a method is disclosed that includes sending an offer message to a mobile device. The offer message identifies a content item that is deliverable via a television service. The method also includes receiving an acceptance message that indicates an acceptance of the offer. Upon acceptance of the offer, the content item may be delivered to the user via the television service.

In a third particular embodiment, a method is disclosed that includes receiving an order for a content item where the order is issued in response to an acceptance of an offer for the content item. The offer for the content item is communicated via an offer message sent to a mobile device. The method also includes providing the content item to the user via the television service.

Figure 1:
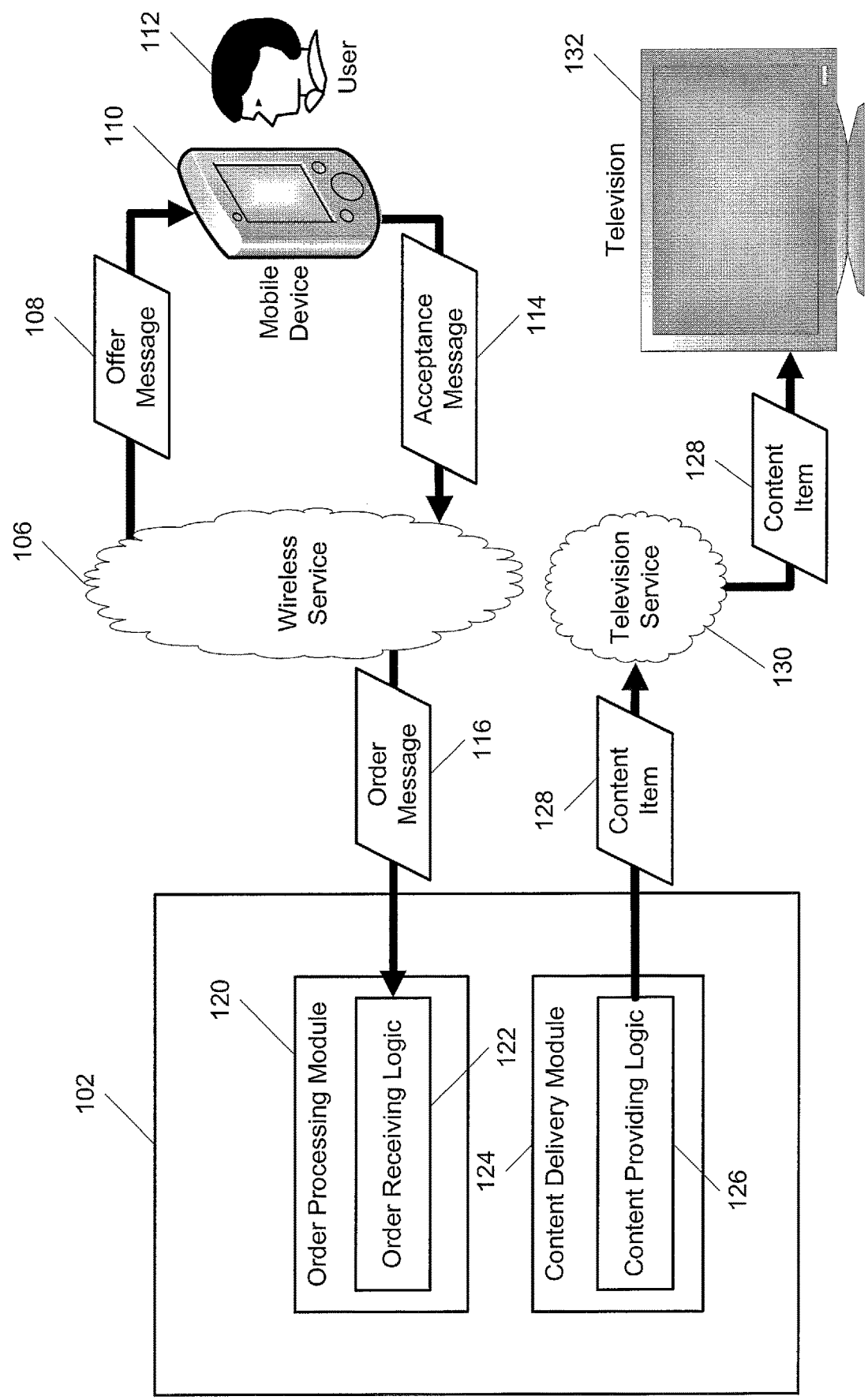
FIG. 1 is a block diagram of a first particular embodiment of a system to receive orders for content items via a wireless service and to deliver the content items via a television service.

Referring to FIG. 1, an illustrative embodiment of a system 102 for processing orders of a content item 128 and for delivering the content item 128 via a television service 130 is disclosed. The system 102 includes an order processing module 120 that is coupled to a wireless service 106. The order processing module 120 can be coupled to the wireless service 106 through order receiving logic 122 that interfaces with the wireless service 106. The wireless service 106 can communicate with a mobile device 110 that is associated with a user 112. The system 102 further includes a content delivery module 124 that can be coupled to a television service 130. The content delivery module 124 may be coupled to the television service 130 through content providing logic 126 that is configured to interface with the television service 130. The television service 130 may be used to send content to one or more display devices such as television 132. Generally, the system 102 may be used to provide offers for content that is deliverable via the television service 130 to a mobile device 110 via the wireless service 106. The system 102 can include a computer processor and computer memory to store computer program instructions that, when executed by the processor, cause the system to carry out the functionality described above.

The wireless service 106 can be configured to provide wireless connectivity to the mobile device 110, such as a mobile telephone, a personal digital assistant (PDA), a smartphone, and other mobile devices. The wireless service 106 can be further configured to transmit messages to the mobile device 110 and to receive messages from the mobile device 110. Such messages may be a short message service (SMS) message, a Multimedia Messaging Service (MMS) message, a Mobile Instant Messaging (MIM) message, an Enhanced Messaging Service (EMS) message, or a message in any other format. The wireless service 106 may also be configured to transmit messages to other devices, such as the order processing module 120, that are configured to interface with the wireless service 106. The wireless service 106 may have a plurality of subscribers or associated users such as user 112.

The television service 130 may be configured to provide media content to display at the television 132. The television service 130 can be further configured to deliver media content directly to the television 132 or to deliver content to the television 132 via an intermediary device such as a set-top box (not shown). The television service 130 may be a cable television service, a satellite television service, an Internet Protocol television (IPTV) service, or any other television service. The television service 130 may have a plurality of subscribers or associated users such as user 112.

The order processing module 120 can be configured to receive orders for media content that is deliverable via the television service 130. The order processing module 120 may be configured to receive the orders for media content directly from the wireless service 106. The order processing module 120 may also be configured to receive orders from an intermediary component such as a server, router, or other device that interfaces with the wireless service 106.

The order processing module 120 may include order receiving logic 122 configured to receive an order for media content. The order receiving logic 122 can be further configured to identify the media content (e.g. a movie, pay-per-view event, or other television programming) ordered by a user 112. The order receiving logic 122 may also be configured to identify the user 112 that originated the order. The order receiving logic 122 can also interface, directly or indirectly, with the content delivery module 124 to request that the identified media content be delivered to the identified user 112 via the television service 130. For example, the order receiving logic 122 may transmit an order for media content directly to the content delivery module 124 via a data communications path between the order receiving logic 122 and the content delivery module 124. In another embodiment, the order receiving logic 122 transmits an order for media content indirectly to the content delivery module 124 by placing the order in shared memory, such as an order queue that is accessible by both the order processing module 120 and the content delivery module 124.

The content delivery module 124 can be configured to initiate delivery of the content item 128 via the television service 130. Media content may be stored in memory accessible by the content delivery module 124 or may be retrieved from an external source, such as a broadcast signal, by the content delivery module 124. For example, when the television service 130 is an IPTV service, the content delivery module 124 may be configured to interact with an acquisition tier of the IPTV service so that the content delivery module 124 can retrieve media content from a broadcast signal via the acquisition tier of the IPTV service. The content delivery module 124 may be included as part of the television service 130 and may be used by the television service 130 to retrieve media content that has been requested by the user 112.

The content delivery module 124 may include content providing logic 126 configured to interface with the television service 130 and further configured to deliver media content to the television service 130. The content providing logic 126 may also be configured to identify the source of media content such as a storage location of the media content. The content providing logic 126 may retrieve the media content and deliver the media content via the television service 130. The content providing logic 126 can be included as part of the television service 130 and can be used by the television service 130 to retrieve media content that has been requested by the user 112.

During operation, the wireless service 106 may transmit an offer message 108 to a mobile device 110 that is associated with a user 112. The offer message 108 may include an offer for media content that is deliverable via the television service 130, such as a movie or pay-per-view event. The offer message 108 can also include information describing the media content and information describing how the user 112 can accept the offer. The user 112 can accept the offer by sending an acceptance message 114 from the mobile device 110. The acceptance message 114 may be of the same format as the offer message 108, or may instead adhere to a different messaging protocol. Upon receiving the acceptance message 114, the wireless service 106 may transmit an order message 116 to the order processing module 120. The order message 116 may include information extracted from the acceptance message 114, such as an identification of the media content ordered by the user 112 (e.g., a title, a date, a time, a channel, a unique program identifier, or any combination thereof), an identification of the user 112 (e.g., a name, a unique user identifier, or any combination thereof), and an identification of the mobile device 110 (e.g., a telephone number of the mobile device 110, a unique mobile device identifier, or any combination thereof). In an alternate embodiment, instead of containing information extracted from the acceptance message 114, the order message 116 may be the acceptance message 114. In such an embodiment, the order processing module 120 may extract information from the order message. In response to the order message, the content delivery module 124 may deliver the content item 128 to the television service 130. The television service 130 may then be used to deliver the content item 128 to a television 132 associated with the user 112. The content item 128 can be a pay-per-view (PPV) item, a Video On Demand (VOD) item, an Audio Video On Demand (AVOD) item, a premium television service subscription, or any other content that can be delivered via the television service 130.

It will be appreciated that the system 102 of FIG. 1 may enable providers of media content to offer such media content to users via the user's mobile device. Thus, a user may learn of available media content (e.g. by receiving an offer message at a cellular telephone) even when the user is not watching television. It will further be appreciated that the system 102 of FIG. 1 may provide mobile device users with the ability to order media content from the mobile device at any time. The system 102 of FIG. 1 may also provide media content providers with an additional mechanism through which the media content provider can advertise media content to consumers.

Figure 2:
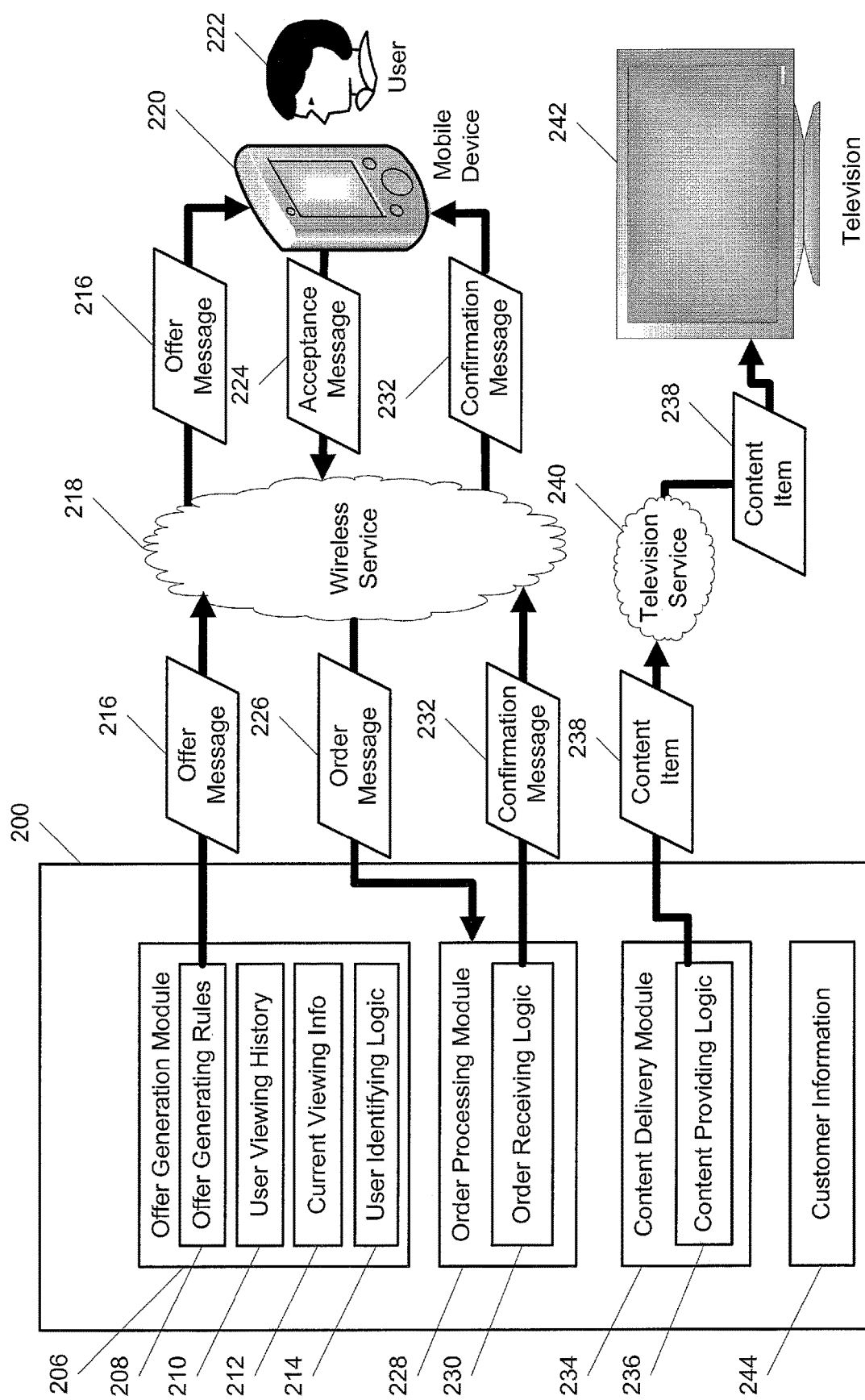
FIG. 2 is a block diagram of a second particular embodiment of a system to receive orders for content items via a wireless service and to deliver the content items via a television service.

Referring to FIG. 2, a block diagram of a second particular embodiment of a system to receive orders for content items and to deliver the content items via a television service is illustrated and designated generally 200. The system 200 can include an order processing module 228, order receiving logic 230, content delivery module 234, and content providing logic 236 such as the order processing module 120, order receiving logic 122, the content delivery module 124, and content providing logic 126 of FIG. 1. The content providing logic 236 can be configured to initiate delivery of a content item 238 to a television 242 via a television service 240. The system 200 can also include an offer generation module 206 and customer information 244.

A wireless service 218 and television service 240 can operate in the same manner as the wireless service 106 and the television service 130 of FIG. 1. The wireless service 218 may be further configured to receive messages from the offer generation module 206 and to receive messages from the order processing module 228. The messages may be a short message service (SMS) message, a Multimedia Messaging Service (MMS) message, a Mobile Instant Messaging (MIM) message, an Enhanced Messaging Service (EMS) message, or a message in any other format.

The offer generation module 206 may be configured to generate offers for media content that is deliverable via the television service 240. The offer generation module 206 can be further configured to send an offer message 216 to the wireless service 218. The offer generation module 206 may include offer generating rules 208 that are configured to determine which offers will be sent to a user 222. The offer generating rules 208 can be configured to determine which offers will be sent to a user 222 based on a variety of criteria, including user viewing history 210, current viewing information 212 for the user, or user preferences provided by the user. The offer generating rules 208 can be further configured to send the offer message 216 to multiple users. For example, the offer message 216 can be sent to all users that are currently viewing a particular program.

The user viewing history 210 can include an identification of the type of programming that has been delivered to the user 222 (e.g. a sporting event, a sitcom episode, a movie, a news broadcast), information identifying the type of programming that has previously been recorded (e.g., via a digital video recorder) by the user 222, information identifying channels that have been watched by the user 222, common viewing times of the user 222, and other indicators of the user's 222 viewing patterns. The user viewing history 210 can be utilized by the offer generating rules 208 to identify media content that may be of interest to the user 222 in view of the user's viewing patterns. For example, an offer to purchase a pay-per-view boxing event may be sent to a user 222 whose user viewing history 210 indicates that the user 222 frequently watches televised boxing matches.

The current viewing information 212 for the user 222 can include the type of programming that the user 222 is currently viewing, the type of programming that the user 222 is currently recording, an identification of specific actors that are appearing in programming that the user 222 is currently viewing, and other indicators of the user's 222 current viewing interests. For example, an offer to purchase an on-demand movie starring a particular actor may be sent to the user 222 when the user's 222 current viewing information 212 indicates that the user 222 is currently watching a movie starring the particular actor.

The user preferences of the user 222 can include a particular genre of movies of interest to the user 222, a particular subject matter of interest to the user 222, a particular actor of interest to the user 222, and other information that can be provided by the user 222 that can be useful for determining which offers should be sent to a user 222. The user can provide such information, for example, through a set-top box, by answering a questionnaire, or by entering the information at a web portal.

The offer generation module 206 may also include user identifying logic 214. The user identifying logic 214 can be configured to identify one or more users (e.g., the user 222) that have an associated wireless service (e.g., the wireless service 218) and an associated television service (e.g., the television service 240). In a particular embodiment, the user identifying logic 214 identifies such users by searching customer information 244 that includes information pertaining to wireless accounts and television subscriptions. For example, when customer information 244 indicates that both a wireless account and a television subscription are registered to the user 222, the user 222 may be identified as having an associated wireless service and an associated television service. In some embodiments, the information pertaining to wireless accounts and television subscriptions may be available to a single vendor that provides wireless service 218 and television service 240 to the user 222.

An offer message 216 can be transmitted from the wireless service 218 to the mobile device 220 as described herein with reference to the offer message 108, the wireless service 106, and the mobile device 110 of FIG. 1. The user 222 may accept the offer by sending an acceptance message 224 to the wireless service 218, and an order message 226 may be sent to the order processing module 228 as described herein with reference to the acceptance message 114, the wireless service 106, the order message 116, and the order processing module 120 of FIG. 1. The order processing module 228 can include order receiving logic 230 that may be further configured to send a confirmation message 232 to the mobile device 220. The confirmation message 232 can include an indication that the order for the content item 238 has been placed. The confirmation message 232 can further include information identifying the content item 238 and the mobile device 220 that originated the order. The confirmation message 232 may be sent any time after the order has been placed.

During operation, the offer generation module 206 can send the offer message 216 to the mobile device 220 via the wireless service 218. The offer generation module 206 may selectively deliver offer messages 216 to the mobile device 220 based on information relating to the viewing habits of the user 222, such as the user's viewing history, the user's current viewing information, and preferences expressly provided by the user 222. The user 222 may accept the offer by sending an acceptance message 224 from the mobile device 220. Upon receiving the acceptance message 224, the wireless service 218 can transmit an order message 226 to the order processing module 228. The order processing module 228 may extract information from the order message 226 and send a confirmation message 232 to the mobile device 220 indicating that the order has been placed. After the order has been received by the system 200, the content delivery module 234 can deliver the content item 238 to the television 242 via the television service 240.

It will be appreciated that the system 200 of FIG. 2 may provide users with offer messages for content that may be more likely to be of interest to the user 222 because the user's viewing habits are taken into consideration when determining what content is offered to the user. It will be further appreciated that a confirmation of the order may be delivered to users so that the users have a record of the order transaction and the users may also be alerted of any fraudulent or unauthorized transactions that have taken place. For example, if the user 222 receives a confirmation message that indicates that an order for an upcoming pay-per-view event has been placed, and the user 222 does not recall ordering the pay-per-view event, the user 222 may contact the television service to inform the television service that the user did not place the order and the television service can block delivery of the pay-per-view event.

Figure 3:
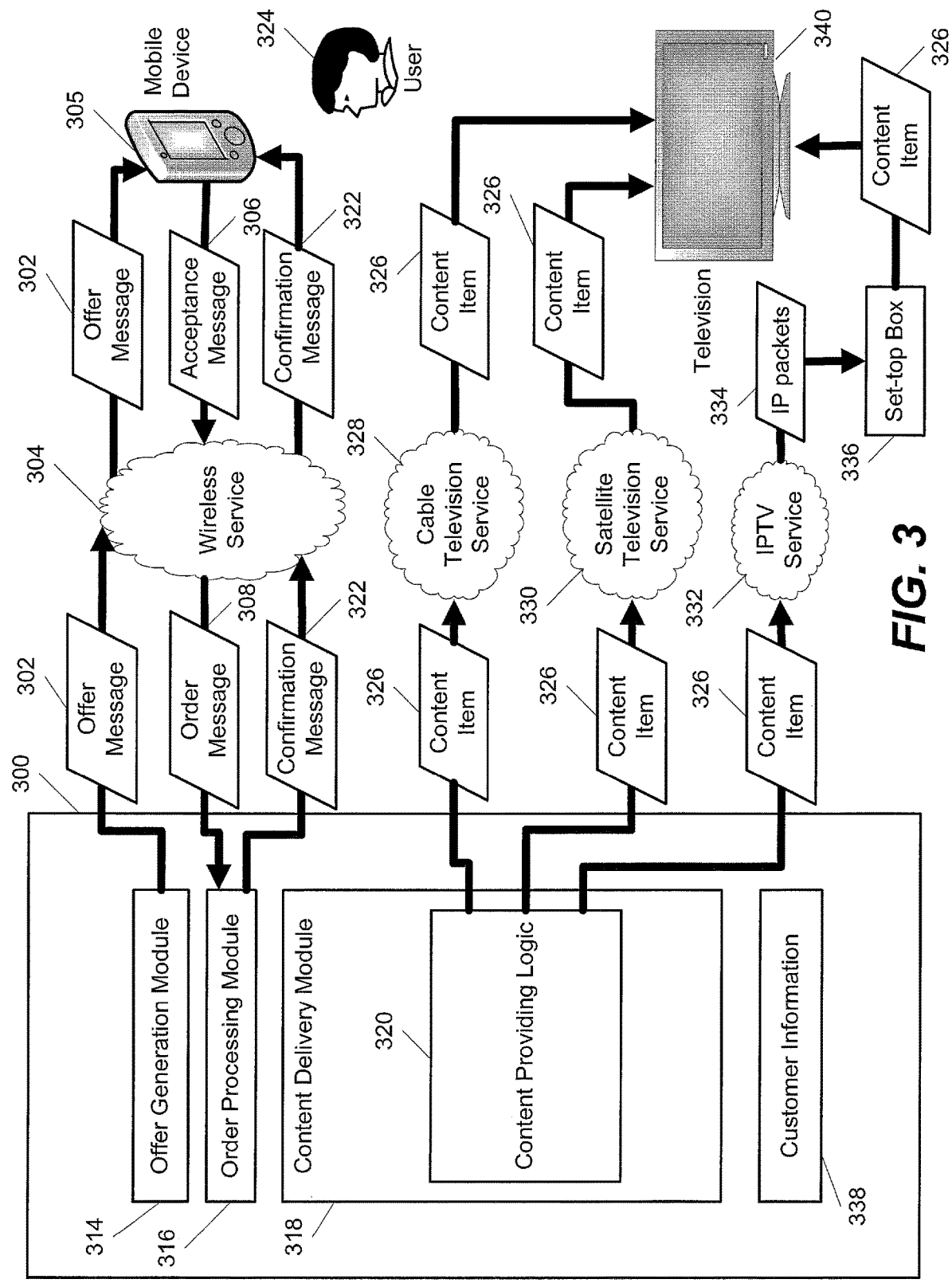
FIG. 3 is a block diagram of a third particular embodiment of a system to receive orders for content items via a wireless service and to deliver the content items via a television service.

Referring to FIG. 3, a block diagram of a third particular embodiment of a system to receive orders for content items and to deliver the content items via a television service is illustrated and designated generally 300. The system 300 can include an offer generation module 314 configured to send an offer message 302 to a mobile device 305 via a wireless service 304 as described herein with reference to the offer generation module 206, the offer message 216, the mobile device 220, and the wireless service 218 of FIG. 2. The system 300 can also include an order processing module 316 configured to receive an order message 308 issued in response to an acceptance message 306 sent from the mobile device 305. The order processing module 316 may also be configured to send a confirmation message 322 to the mobile device 305 as described herein with reference to the order processing module 228, the confirmation message 232, and the mobile device 220 of FIG. 2. The system 300 can also include customer information 338 and a content delivery module 318 that may include content providing logic 320 capable of delivering a content item 326 to a television service, such as a cable television service 328, a satellite television service 330, and an IPTV service 332.

A cable television service 328 can include any system capable of providing television programming via radio frequency signals that are transmitted through fixed optical fibers or coaxial cables. A satellite television service 330 can include any system capable of delivering television programming through the use of a communications satellite, where the television programming is received by a satellite dish and set-top box. An IPTV service 332 can include any system capable of delivering television programming using Internet Protocol (IP) over a network infrastructure. When a content item 326 is delivered to the IPTV service 332, the content item may be transformed into a collection of IP packets 334 that are delivered to a set-top box 336. The set-top box 336 may be configured to assemble the IP packets 334 into a video stream that includes the content item 326. The set-top box 336 may be further configured to deliver the video stream to the television 340.

It will be appreciated that the system 300 of FIG. 3 may enable wireless service providers to send offer messages regarding media content to users subscribing to any of multiple television services (e.g., a cable television service, a satellite television service, or an IPTV service). Wireless service users may therefore be able to receive offer messages for media content of interest to users of different types of television services.

Figure 4:
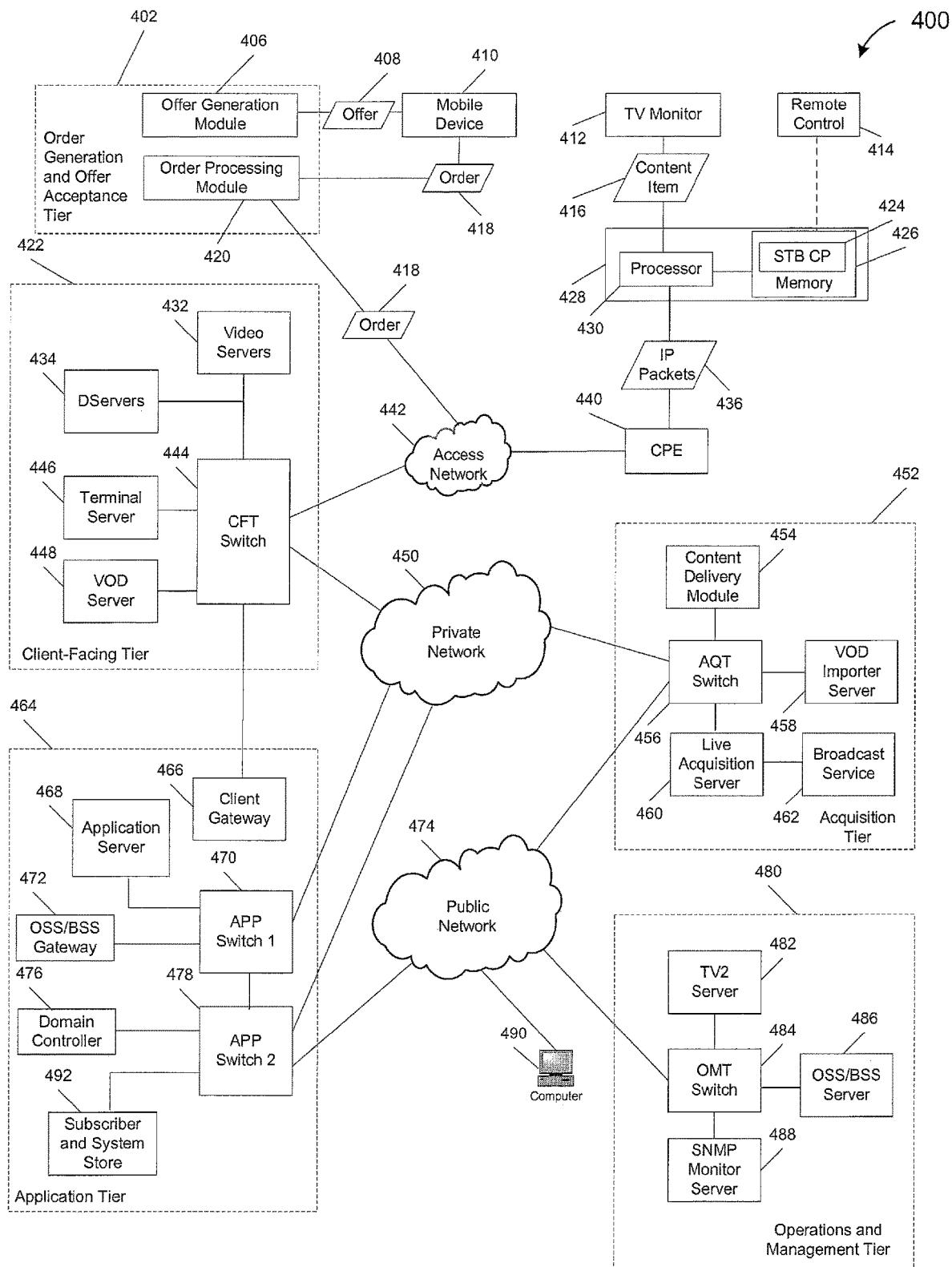
FIG. 4 is a block diagram of a fourth particular embodiment of a system to receive orders for content items via a wireless service and to deliver the content items via a television service.

Referring to FIG. 4, a fourth particular embodiment of a system to receive orders for content items and to deliver the content items via an IPTV television service is illustrated and generally designated 400. The embodiment of FIG. 4 is included only for illustrative purposes and in no way represents a limiting embodiment of this invention. Readers will understand that the television service can be a cable television service, satellite television service, or any other television service. Furthermore, the embodiment of FIG. 4 describes only one possible implementation of an IPTV television service and in no way represents a limiting embodiment for IPTV television services. Readers will understand that an IPTV television service can be embodied in many other ways and that each alternative embodiment is within the scope of the present invention.

The television system is an IPTV system configured to deliver a content item 416. As shown, the system 400 can include a client facing tier 422, an application tier 464, an acquisition tier 452, an operations and management tier 480, and an order generation and offer acceptance tier 402. Each tier 402, 422, 452, 464, and 480 can be coupled to a private network 450; to a public network 474, such as the Internet; an access network 442; or to more than one of the private network 450, the public network 474, and the access network 442. For example, the client-facing tier 422 can be coupled to the private network 450 and the access network 442. Further, the application tier 464 can be coupled to the private network 450 and to the public network 474. The acquisition tier 452 can also be coupled to the private network 450 and to the public network 474. Additionally, the operations and management tier 480 can be coupled to the public network 474.

As illustrated in FIG. 4, the various tiers 402, 422, 452, 464, and 480 may communicate with each other via the private network 450, the public network 474, and the access network 442. For instance, the client-facing tier 422 can communicate with the application tier 464 and the acquisition tier 452 via the private network 450. The client-facing tier 422 can also communicate with the order generation and offer acceptance tier 402 via the access network 442. The application tier 464 can communicate with the acquisition tier 452 via the private network 450. Further, the application tier 464 can communicate with the acquisition tier 452 and the operations and management tier 480 via the public network 474. Moreover, the acquisition tier 452 can communicate with the operations and management tier 480 via the public network 474. In a particular embodiment, elements of the application tier 464, including, but not limited to, a client gateway 466, can communicate directly with the client-facing tier 422.

The client-facing tier 422 may communicate with user equipment via an access network 442, such as an Internet Protocol Television (IPTV) access network. In an illustrative embodiment, customer premises equipment (CPE) 440 can be coupled to a local switch, router, or other device of the access network 442. The client-facing tier 422 can communicate with a representative set-top box device 428 at a customer premise via the CPE 440. The CPE 440 can include routers, local area network devices, modems, such as digital subscriber line (DSL) modems, any other suitable devices for facilitating communication between a set-top box device and the access network 442, or any combination thereof.

In a particular embodiment, the client-facing tier 422 can be coupled to the CPE 440 via fiber optic cables. Alternatively, the CPE 440 can include digital subscriber line (DSL) modems that are coupled to one or more network nodes via twisted pairs, and the client-facing tier 422 can be coupled to the network nodes via fiber-optic cables. The set-top box device 428 can process data received via the access network 442, via an IPTV software platform, such as Microsoft® TV IPTV Edition.

The set-top box device 428 can be coupled to an external display device, such as a television monitor 412. Moreover, the set-top box device 428 can communicate with a remote control 414. The set-top box device 428 can include IPTV set-top box devices as well as video gaming devices or consoles that are adapted to receive IPTV content. The set-top box device 428 can also include personal computers or other computing devices that are adapted to emulate set-top box device functionalities and any other device adapted to receive IPTV content and transmit data to an IPTV system via an access network.

In an exemplary, non-limiting embodiment, the set-top box device 428 can receive data, video, or any combination thereof, from the client-facing tier 422 via the access network 442 and render or display the data, video, or any combination thereof, at the display device 412 to which it is coupled. In an illustrative embodiment, the set-top box device 428 can include tuners that receive and decode television programming signals or packet streams 436 for transmission of a content item 416 to the display device 412. Further, the set-top box device 428 can include a STB processor 430 and a STB memory device 426 that is accessible to the STB processor 430. In one embodiment, a computer program, such as the STB computer program 424, can be embedded within the STB memory device 426. In another illustrative embodiment, a user computing device, such as a personal computer, laptop or local server, can be coupled to the set-top box device 428, for example, via a universal serial bus (USB) connection or other connection.

The client-facing tier 422 can also communicate with the order generation and offer acceptance tier 402 via an access network 442, such as an Internet Protocol Television (IPTV) access network. In an illustrative embodiment, order generation and offer acceptance tier 402 can be coupled to a local switch, router, or other device of the access network 442. The client-facing tier 422 can communicate with the order generation and offer acceptance tier 402 via the order processing module 420. The order generation and offer acceptance tier 402 can include routers, local area network devices, modems, such as digital subscriber line (DSL) modems, any other suitable devices for facilitating communication between a the order processing module 420 and the access network 442, or any combination thereof.

In a particular embodiment, the client-facing tier 422 can be coupled to the order processing module 420 via fiber optic cables. Alternatively, the order processing module 420 can include digital subscriber line (DSL) modems that are coupled to one or more network nodes via twisted pairs, and the client-facing tier 422 can be coupled to the network nodes via fiber-optic cables. The order processing module 420 can transmit an order 418 for media content to the access network 442 in the same way that a request for content could be generated via a user command issued from the remote control 414 through the set-top box device 428 and the CPE 440. To the access network 442, the order generation and offer acceptance tier 402 of this embodiment can appear as a CPE 440 that may request a content item 416 for delivery to a display device 412.

The order generation and offer acceptance tier 402 can further include an offer generating module 406 that may be configured to send offer 408 messages to a mobile device 410 as described above with reference to FIGS. 1-3. The mobile device 410 may issue an acceptance message and place an order 418 for a content item 416 that can be delivered to the order processing module 420. The order processing module 420 may also request the content item 416 by issuing an order 418 that conforms to the same format as, and appears as, a request for content that is issued from a CPE 440. Thus the system 400 may be configured to receive the order message 418 originated by the mobile device 410 and process the order message 418 in a similar manner as orders for content generated from the set-top box 428.

In an illustrative embodiment, the client-facing tier 422 can include a client-facing tier (CFT) switch 444 that manages communication between the client-facing tier 422 and the access network 442 and between the client-facing tier 422 and the private network 450. As illustrated, the CFT switch 444 is coupled to one or more data servers, such as D-servers 434, that store, format, encode, replicate, or otherwise manipulate or prepare video content for communication from the client-facing tier 422 to the set-top box device 428. The CFT switch 444 can also be coupled to a terminal server 446 that provides terminal devices with a connection point to the private network 450. In a particular embodiment, the CFT switch 444 can be coupled to a video-on-demand (VOD) server 448 that stores or provides VOD content imported by the IPTV system 400.

Further, the CFT switch 444 is coupled to one or more video servers 432 that receive video content and transmit the content to the set-top box 428 via the access network 442. In a particular embodiment, the CFT switch 444 can be coupled to one or more publication servers that facilitate the formation of groups that share private content and the inclusion of indicators of such private content with video content received by users in a group.

In an illustrative embodiment, the client-facing tier 422 can communicate with a large number of set-top boxes, such as the representative set-top box 428 over a wide geographic area, such as a regional area, a metropolitan area, a viewing area, a designated market area or any other suitable geographic area, market area, or subscriber or customer group that can be supported by networking the client-facing tier 422 to numerous set-top box devices. In a particular embodiment, the CFT switch 444, or any portion thereof, can include a multicast router or switch that feeds one or more video streams from a video server to multiple set-top box devices.

As illustrated in FIG. 4, the application tier 464 can communicate with both the private network 450 and the public network 474. The application tier 464 can include a first application tier (APP) switch 470 and a second APP switch 478. In a particular embodiment, the first APP switch 470 can be coupled to the second APP switch 478. The first APP switch 470 can be coupled to an application server 468 and to an OSS/BSS gateway 472. In a particular embodiment, the application server 468 can provide applications to the set-top box device 428 via the access network 442, which enable the set-top box device 428 to provide functions, such as display, messaging, processing of IPTV data and VOD material, etc. In a particular embodiment, the OSS/BSS gateway 472 includes operation systems and support (OSS) data, as well as billing systems and support (BSS) data. In one embodiment, the OSS/BSS gateway 472 can provide or restrict access to an OSS/BSS server 486 that stores operations and billing systems data.

The second APP switch 478 can be coupled to a domain controller 476 that provides Internet access, for example, to users at their computers 490 via the public network 474. For example, the domain controller 476 can provide remote Internet access to IPTV account information, e-mail, personalized Internet services, or other online services via the public network 474. In addition, the second APP switch 478 can be coupled to a subscriber and system store 492 that includes account information, such as account information that is associated with users who access the IPTV system 400 via the private network 450 or the public network 474. In an illustrative embodiment, the subscriber and system store 492 can store subscriber or customer data and create subscriber or customer profiles that are associated with IP addresses of corresponding set-top box device 428.

In a particular embodiment, the application tier 464 can include a client gateway 466 that communicates data directly to the client-facing tier 422. The client gateway 466 may be coupled directly to the CFT switch 444. The client gateway 466 can provide user access to the private network 450 and the tiers coupled thereto. In an illustrative embodiment, the set-top box device 428 can access the IPTV system 400 via the access network 442, using information received from the client gateway 466. User devices can access the client gateway 466 via the access network 442, and the client gateway 466 can allow such devices to access the private network 450 once the devices are authenticated or verified. Similarly, the client gateway 466 can prevent unauthorized devices, such as hacker computers or stolen set-top box devices from accessing the private network 450, by denying access to these devices beyond the access network 442.

For example, when the representative set-top box device 428 accesses the client-facing tier 422 via the access network 442, the client gateway 466 can verify subscriber information by communicating with the subscriber and system store 492 via the private network 450. Further, the client gateway 466 can verify billing information and status by communicating with the OSS/BSS gateway 472 via the private network 450. In one embodiment, the OSS/BSS gateway 472 can transmit a query via the public network 474 to the OSS/BSS server 486. After the client gateway 466 confirms subscriber and/or billing information, the client gateway 466 can allow the set-top box device 428 to access IPTV content and VOD content at the client-facing tier 422. If the client gateway 466 cannot verify subscriber information for the set-top box device 428, e.g., because it is connected to an unauthorized twisted pair, the client gateway 466 can block transmissions to and from the set-top box device 428 beyond the access network 442.

As indicated in FIG. 4, the acquisition tier 452 can include an acquisition tier (AQT) switch 456 that communicates with the private network 450. The AQT switch 456 can also communicate with the operations and management tier 480 via the public network 474. In a particular embodiment, the AQT switch 456 can be coupled to a live acquisition server 460 that receives or acquires television content, movie content, advertisement content, other video content, or any combination thereof, from a broadcast service 462, such as a satellite acquisition system or satellite head-end office. In a particular embodiment, the live acquisition server 460 can transmit content to the AQT switch 456, and the AQT switch 456 can transmit the content to the CFT switch 444 via the private network 450. The AQT switch 456 can also be coupled to a content delivery module 454 that may includes television content, movie content, advertisement content, other video content, or any combination thereof, from memory associated with the content delivery module 454.

In an illustrative embodiment, content can be transmitted to the D-servers 434, where it can be encoded, formatted, stored, replicated, or otherwise manipulated and prepared for communication from the video server(s) 432 to the set-top box device 428. The CFT switch 444 can receive content from the video server(s) 432 and communicate the content to the CPE 440 via the access network 442. The set-top box device 428 can receive the content via the CPE 440, and can transmit the content to the television monitor 412. In an illustrative embodiment, video or audio portions of the content can be streamed to the set-top box device 428.

Further, the AQT switch 456 can be coupled to a video-on-demand importer server 458 that receives and stores television or movie content received at the acquisition tier 452 and communicates the stored content to the VOD server 448 at the client-facing tier 422 via the private network 450. Additionally, at the acquisition tier 452, the video-on-demand (VOD) importer server 458 can receive content from one or more VOD sources outside the IPTV system 400, such as movie studios and programmers of non-live content. The VOD importer server 458 can transmit the VOD content to the AQT switch 456, and the AQT switch 456, in turn, can communicate the material to the CFT switch 444 via the private network 450. The VOD content can be stored at one or more servers, such as the VOD server 448.

When users issue requests for VOD content via the set-top box device 428 or the order processing module 420, the requests can be transmitted over the access network 442 to the VOD server 448, via the CFT switch 444. Upon receiving such requests, the VOD server 448 can retrieve the requested VOD content and transmit the content to the set-top box device 428 across the access network 442, via the CFT switch 444. The set-top box device 428 can transmit the VOD content to the television monitor 412. In an illustrative embodiment, video or audio portions of VOD content can be streamed to the set-top box device 428.

FIG. 4 further illustrates that the operations and management tier 480 can include an operations and management tier (OMT) switch 484 that conducts communication between the operations and management tier 480 and the public network 474. In the embodiment illustrated by FIG. 4, the OMT switch 484 is coupled to a TV2 server 482. Additionally, the OMT switch 484 can be coupled to an OSS/BSS server 486 and to a simple network management protocol (SNMP) monitor 488 that monitors network devices within or coupled to the IPTV system 400. In a particular embodiment, the OMT switch 484 can communicate with the AQT switch 456 via the public network 474.

In an illustrative embodiment, the live acquisition server 460 can transmit content to the AQT switch 456, and the AQT switch 456, in turn, can transmit the content to the OMT switch 484 via the public network 474. In this embodiment, the OMT switch 484 can transmit the content to the TV2 server 482 for display to users accessing the user interface at the TV2 server 482. For example, a user can access the TV2 server 482 using a personal computer (PC) 490 coupled to the public network 474.

It will be appreciated that the system 400 of FIG. 4 can take advantage of the benefits provided by an IPTV television service relative to other television services. For example, the IP-based platform may provide the ability to integrate television services with other IP-based services such as high speed Internet access and VoIP telephone services. Furthermore, an IPTV television service may be less susceptible to loss of service issues that can arise during inclement weather relative to other television services such as a satellite television service or television services that utilize traditional broadcast television signals. As discussed herein, the embodiment of FIG. 4 is included for illustrative purposes and in no way is intended to limit the scope of the present application.

Figure 5:
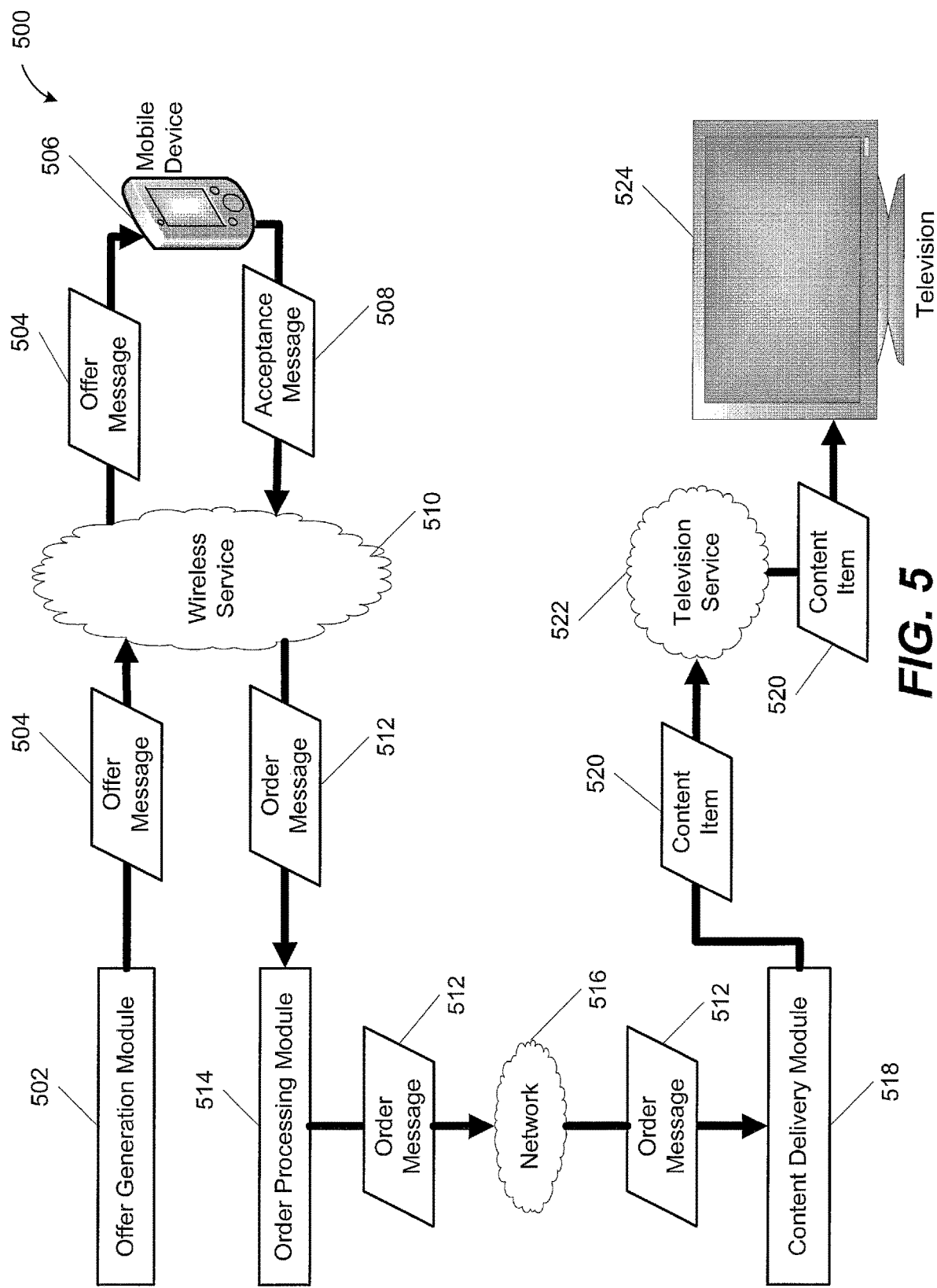
FIG. 5 is a block diagram of a fifth particular embodiment of a system to receive orders for content items via a wireless service and to deliver the content items via a television service.

Referring to FIG. 5, a block diagram of a fifth particular embodiment of a system to receive orders for content items and to deliver the content items via a television service is illustrated and designated generally 500. The system 500 includes an offer generation module 502 that may be configured to send an offer message 504 to a mobile device 506 via a wireless service 510. The system may also include an order processing module 514 that can be configured to receive an order message 512 issued in response to an acceptance message 508 sent from the mobile device 506. In a particular embodiment, a user receiving the offer message 504, sending the acceptance message 508, and generating the order message 512 may not be billed for any of the messages 504, 508, 512. The order processing module 514 can also be configured to send the order message 512 to a content delivery module 518 capable of delivering a content item 520 to a television 524 via a television service 522.

The order processing module 514 and the content delivery module 518 may be configured to communicate via a data communications network 516. The data communications network 516 can be embodied as a local area network (LAN), a wide area network (WAN), or as a wireless service. The order processing module 514 and the content delivery module 518 may also be configured to communication via some other data communications path such as a computer bus.

It will be appreciated that because the order processing module 514 and the content delivery module 518 can communicate via a network 516, the system 500 of FIG. 5 may enable providers of a wireless service to cooperate with providers of a television service to offer consumers the functionality described herein. For example, a particular wireless service provider may enter into agreements with multiple television service providers (e.g., cable television service providers, satellite television service providers, and IPTV service providers).

Figure 6:
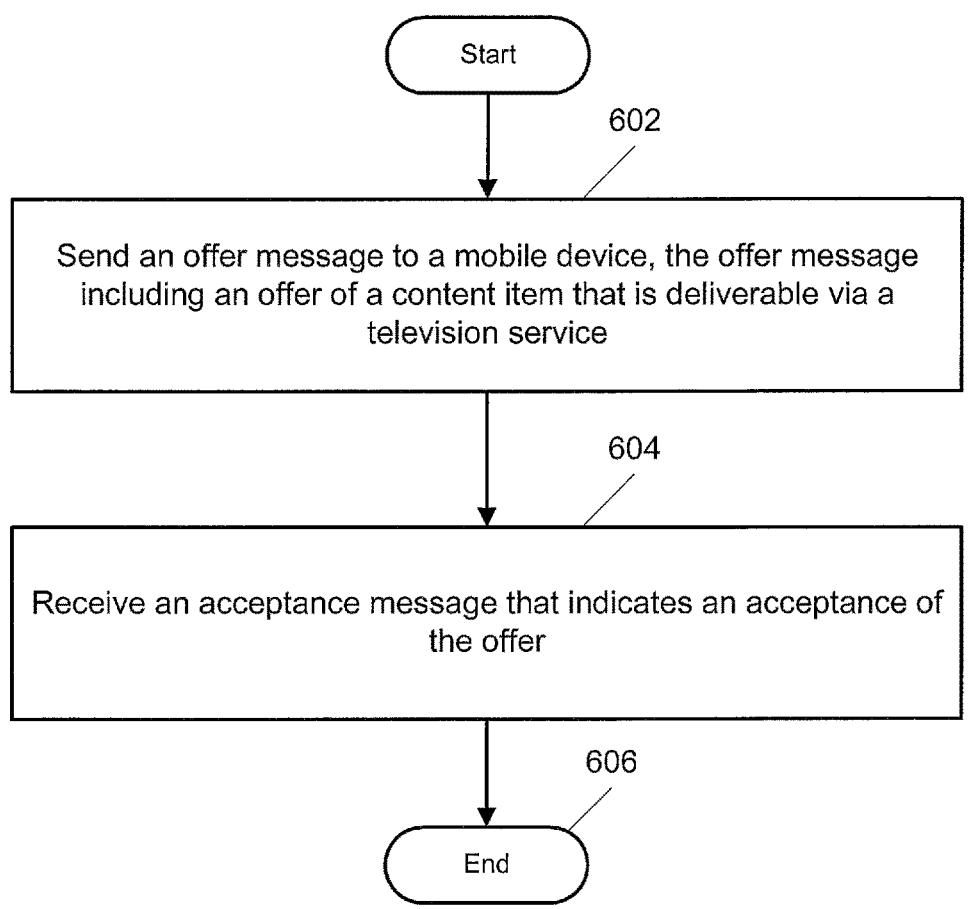
FIG. 6 is a flow diagram of a first particular embodiment of a method to send an offer for a content item to a mobile device and to receive acceptance of the offer from the mobile device.

Referring to FIG. 6, a flow diagram of a first particular embodiment of a method to send an offer for a content item to a mobile device and to receive acceptance of the offer from the mobile device is illustrated and generally designated 600.

At 602, an offer message is sent to a mobile device, the offer message including an offer of a content item that is deliverable via a television service. Examples of content items that are deliverable via a television service include, but are not limited to, a pay-per-view event, an on-demand movie, other on-demand video, an out-of-market sports package, or a subscription for premium television programming. For example, in FIG. 1, the offer message 108 may be sent to the mobile device 110.

Moving to 604, an acceptance message that indicates an acceptance of the offer is received. The acceptance message can be an SMS message, an MMS message, a MIM message, or an EMS message sent from the mobile device. In other embodiments, acceptance of the offer can occur, for example, by making a telephone call to a phone number listed in the offer message, by following a hyperlink listed in the offer message, or in other ways of communicating acceptance of an offer. For example, in FIG. 1, the acceptance message 114 may be received at the wireless service 106. The method 600 terminates at 606.

Figure 7:
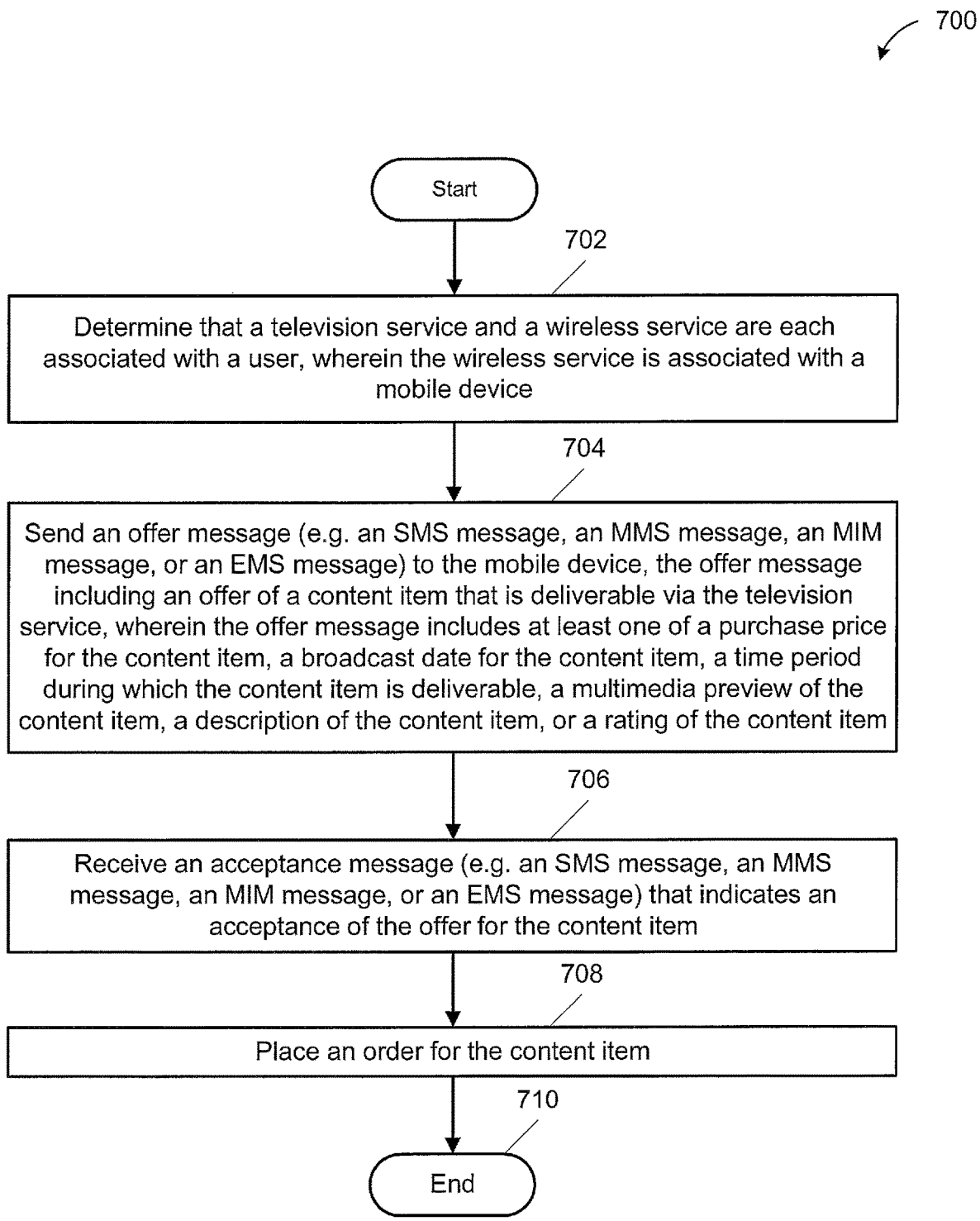
FIG. 7 is a flow diagram of a second particular embodiment of a method to send an offer for a content item to a mobile device and to receive acceptance of the offer from the mobile device.

Referring to FIG. 7, a flow diagram of a second particular embodiment of a method to send an offer for a content item to a mobile device and to receive acceptance of the offer from the mobile device is illustrated and generally designated 700.

At 702, is the method determines that a television service and a wireless service are each associated with a user. The wireless service is also associated with a mobile device. The determination may be made, for example, by searching a single data source that includes records for wireless service subscriptions and television service subscriptions to identify users that have both a wireless service account and a television service account. In such an embodiment, the wireless and television service can be provided by the same vendor. In other embodiments, multiple data sources may be searched to identify users that have a wireless service account and a television service account that are provided by different vendors. For example, in FIG. 2, it may be determined, based on the customer information 244, that the user 222 is associated with both the wireless service 218 and the television service 240. For further example, in FIG. 4, account information that identifies wireless service subscribers can be compared to account information stored in the subscriber and system store 492 of FIG. 4 to identify particular users that have both a wireless television service account and an IPTV television service account.

Advancing to 704, an offer message is sent to the mobile device that is associated with the wireless service of the user. The offer message can be an SMS message, an MMS message, an MIM message, or an EMS message. The offer message includes an offer of a content item that is deliverable via the television service. The offer message may also include at least one of a purchase price for the content item, a broadcast date for the content item, a time period during which the content item is available for delivery, a multimedia preview of the content item, a description of the content item, or a rating of the content item. The multimedia preview can include a multimedia attachment to the message itself or a link to multimedia content that is stored remotely. For example, in FIG. 2, the offer message 216 may be sent to the mobile device 220 of the user 222. In a particular embodiment, the offer message 216 may be sent to multiple devices and multiple users.

Continuing to 706, an acceptance message that indicates an acceptance of the offer is received. The acceptance message can be an SMS message, an MMS message, a MIM message, or an EMS message sent from the mobile device. In some embodiments, the acceptance message can include a user specific password required to authorize the order, an indication that a user accepts the terms of use of the content item, and other information. The offer message may include text that specifies the terms of use and text that states that by sending an acceptance message, the user accepts the terms of use specified in the offer message. For example, in FIG. 2, the acceptance message 224 may be received.

Moving to block 708, an order can be placed for the content item. In this example, placing an order may include interacting with an order processing mechanism associated with the television service. The order may include an identification of the content item, an identification of the user that placed the order, and any other information useful for identifying the appropriate content item to be delivered to the appropriate user. For example, in FIG. 2, an order for the content item 238 may be placed. The method 700 terminates at 710.

Figure 8:
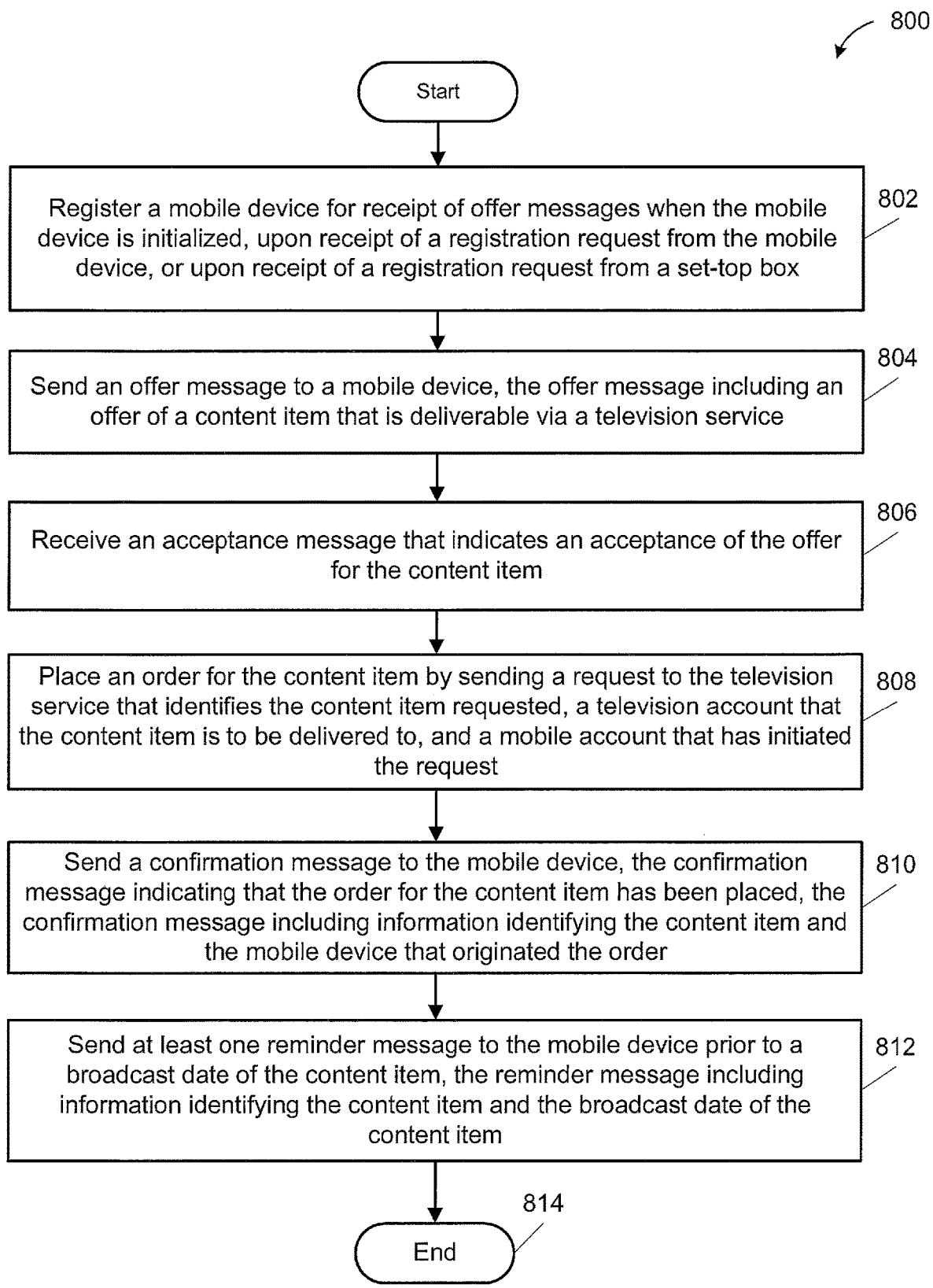
FIG. 8 is a flow diagram of a third particular embodiment of a method to send an offer for a content item to a mobile device and to receive acceptance of the offer from the mobile device.

Referring to FIG. 8, a flow diagram of a third particular embodiment of a method to send an offer for a content item to a mobile device and to receive acceptance of the offer from the mobile device is illustrated and generally designated 800.

At block 802, a mobile device is registered for receipt of offer messages. The mobile device can be registered for receipt of offer messages when the mobile device is initialized. For example, referring to FIG. 2, the user 222 may register for receipt of offer messages when purchasing or initializing the mobile device 220. For example, a standard contract for wireless service can include a clause that allows a new wireless subscriber to consent to the receipt of offer messages at the mobile device. This clause can also enable a user to provide information identifying the user's television service. Alternately, the user 222 may register via a set-top box that is associated with the television service 240 associated with the user. For example, the user could use a remote control of the set-top box to register a mobile device for receipt of offer messages by providing the telephone number of the mobile device.

Advancing to block 804, an offer message is sent to a mobile device, the offer message including an offer of a content item that is deliverable via a television service. For example, referring to FIG. 2, the offer message 216 may be sent to the mobile device 220.

Continuing to block 806, an acceptance message is received that indicates an acceptance of the offer for the content item. For example, referring to FIG. 2, the acceptance message 224 may be received at the wireless service 218.

Moving to block 808, an order for the content item is placed by sending a request to the television service that identifies the content item requested. The request may also include an identification of a television account that the content item is to be delivered to, and an identification of a mobile account that has initiated the request. The television account can represent a specific subscription to a television service. The mobile account can represent a specific subscription to a wireless service. The request can be embodied in any format that the television service is capable of processing. The request can also include any additional information required by the television service so that the order can be processed. Additional information can include, for example, a predetermined user specific authorization code (e.g. a password) that is required to place an order. For example, referring to FIG. 2, an order for the content item 238 may be placed by sending a request from the order processing module 228 to the content delivery module 234.

Advancing to block 810, a confirmation message is sent to the mobile device. The confirmation message indicates that the order for the content item has been placed. The confirmation message can include information identifying the content item and the mobile device that originated the order. The confirmation message can further include information identifying the time and date at which the order was placed, the broadcast time and date of the content item, the amount charged to a user's television service account, and other information. For example, referring to FIG. 2, the confirmation message 232 may be sent from the order processing module 228 to the mobile device 220 via the wireless service 218.

Moving to block 812, at least one reminder message may be sent to the mobile device prior to a broadcast date of the content item. The reminder message can include information identifying the content item and the broadcast date of the content item. The reminder message can further include the television channel over which the content item will be delivered, the time period during which the content item will be available, and other information as will occur to those of skill in the art. For example, referring to FIG. 2, a reminder message may be sent to the mobile device 220 prior to the broadcast date of the content item 238. The method terminates at 814.

Figure 9:
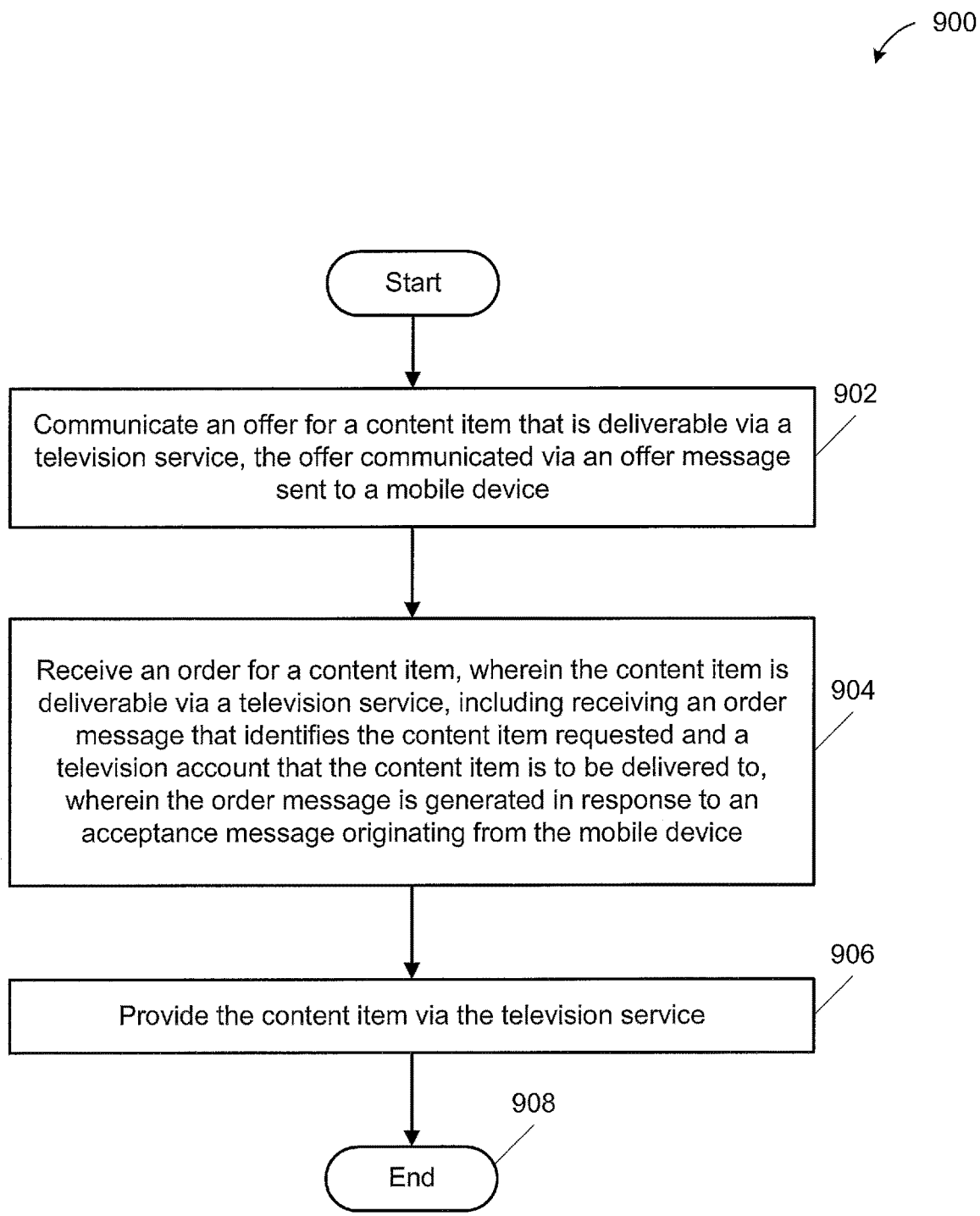
FIG. 9 is a flow diagram of a particular embodiment of a method to receive an order for a content item and to deliver the content item via a television service.

Referring to FIG. 9, a flow diagram of an embodiment of a method to receive an order for a content item and to deliver the content item via a television service is illustrated and generally designated 900.

At block 902, an offer for a content item that is deliverable via a television service is communicated via an offer message to a mobile device. For example, referring to FIG. 5, an offer for the content item 520 may be communicated via the offer message 504 to the mobile device 506.

Moving to block 904, an order is received for the content item that is deliverable via a television service. Receiving an order may include receiving an order message that identifies the content item requested and a television account that the content item is to be delivered to. The order message is generated in response to an acceptance message originating from the mobile device. For example, referring to FIG. 5, an order (e.g., the order message 512) for the content item 520 may be received at the content delivery module 518 via the network 516.

Moving to block 906, the content item is provided by the television service. Providing the content item can be carried out in any manner available to the television service, such as providing the content item over a cable, a satellite link, a data network, or other any data transmission method. For example, referring to FIG. 5, the content item 520 may be provided by the television service 522 via the content delivery module 518. The method 900 terminates at 908.

Figure 10:
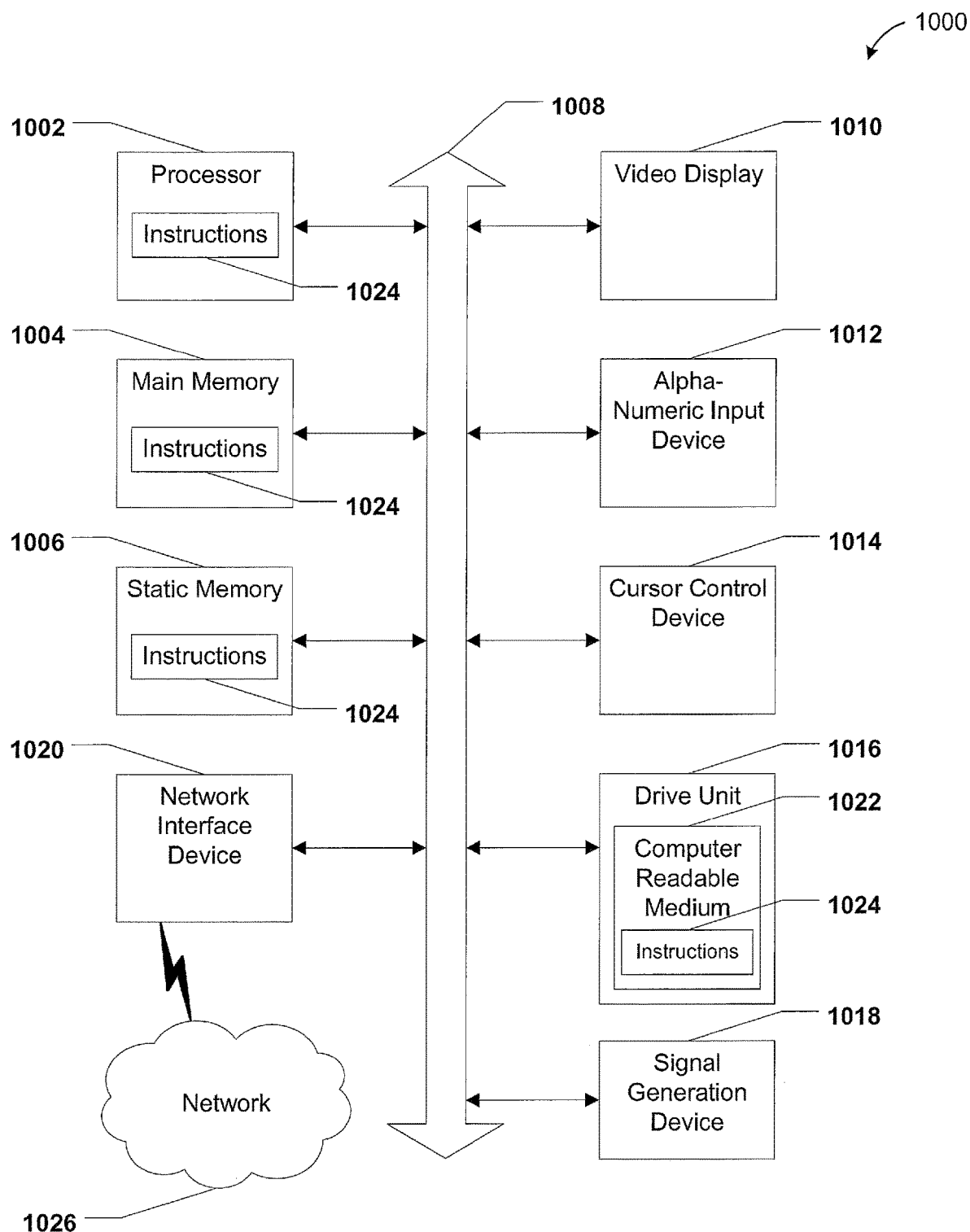
FIG. 10 is a block diagram of an illustrative embodiment of a general computer system.

Referring to FIG. 10, an illustrative embodiment of a general computer system is shown and is designated 1000. The computer system 1000 may include a set of instructions that can be executed to cause the computer system 1000 to perform any one or more of the methods or computer based functions disclosed herein. The computer system 1000 may operate as a standalone device or may be connected, e.g., using a network, to other computer systems or peripheral devices. For example, the computer system 1000 may include or be included within any one or more of the order processing modules 120, 228, 316, 420, and 514 as described with reference to FIGS. 1-5. The computer system 1000 may also include or be included within any one or more of the content delivery modules 124, 234, 318, 454, and 518 as described with reference to FIGS. 1-5. The computer system 1000 may also include or be included within any one or more of the offer generation modules 206, 314, 406, and 502 as described with reference to FIGS. 1-5.

In a networked deployment, the computer system 1000 may operate in the capacity of a server or as a client user computer in a server-client user network environment, or as a peer computer system in a peer-to-peer (or distributed) network environment. The computer system 1000 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a web appliance, or any other machine capable of executing a set of instructions (sequential or otherwise) that specify actions to be taken by that machine. In a particular embodiment, the computer system 1000 may be implemented using electronic devices that provide video, audio, or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. Moreover, the computer system 1000 may include a main memory 1004 and a static memory 1006, which can communicate with each other via a bus 1008. As shown, the computer system 1000 may further include a video display unit 1010, such as a liquid crystal display (LCD), a projection television system, a flat panel display, or a solid state display. Additionally, the computer system 1000 may include an input device 1012, such as a keyboard, and a cursor control device 1014, such as a mouse. The computer system 1000 may also include a disk drive unit 1016, a signal generation device 1018, such as a speaker or remote control, and a network interface device 1020. Some computer systems 1000 may not include an input device (e.g., a server may not include an input device).

In a particular embodiment, as depicted in FIG. 10, the disk drive unit 1016 may include a computer-readable storage medium 1022 in which one or more sets of instructions 1024, e.g. software, can be embedded. Further, the instructions 1024 may embody one or more of the methods or logic as described herein. In a particular embodiment, the instructions 1024 may reside completely, or at least partially, within the main memory 1024, the static memory 1006, and/or within the processor 1002 during execution by the computer system 1000. The main memory 1004 and the processor 1002 also may include computer-readable media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable storage medium that stores instructions 1024 or receives, stores and executes instructions 1024, so that a device connected to a network 1026 may communicate voice, video or data over the network 1026. Further, the instructions 1024 may be transmitted or received over the network 1026 via the network interface device 1020.

While the computer-readable storage medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable storage medium may include a solid-state memory such as a memory card or other package that houses one or more non-volatile read-only memories. Further, the computer-readable storage medium may be a random access memory or other volatile re-writable memory. Additionally, the computer-readable storage medium may include a magneto-optical or optical medium, such as a disk or tapes or other storage device. A digital file attachment to an e-mail or other self-contained information archive or set of archives may be considered equivalent to a tangible storage medium. Accordingly, the disclosure is considered to include any one or more of a computer-readable storage medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., SMS, MMS, MIM, and EMS) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
sending, from a first device to a server via a first network associated with a wireless service, a registration request, the registration request requesting receipt of offer messages for multimedia content items at the first device, the offer messages offering content items;
receiving, at the first device from the server via the first network, an offer for a content item that is deliverable via a multimedia service to a second device distinct from the first device, wherein the first device and the second device are associated with a particular user, wherein the particular user has access at the second device to a plurality of types television services including a satellite television service, a cable television service and a streaming television service, and wherein the offer is responsive to receipt of the registration request at the second device and wherein the offer is based on a viewing history associated with the second device, and wherein the content item is selected by the server for the offer based on a type of television service used by the particular user for viewing multimedia content items at the second device;
receiving, at the first device, input indicating an acceptance of the offer; and
sending, from the first device to the server via the wireless service, information indicating the acceptance of the offer responsive to the input, the server configured to send, based on the information, the content item to the second device according to the type of television service used by the particular user for viewing multimedia content items at the second device.

2. The method of claim 1, further comprising receiving, at the first device, a confirmation message from the server responsive to sending the information, wherein the confirmation message acknowledges the acceptance of the offer.

3. The method of claim 2, wherein the confirmation message identifies the content item.

4. The method of claim 1, further comprising receiving a reminder message at the first device prior to a broadcast time of the content item.

5. The method of claim 4, wherein the reminder message includes information identifying the content item and the broadcast time of the content item.

6. The method of claim 1, wherein the sending a registration request from the first device to the server comprises sending a registration request to a set-top box associated with the multimedia service for delivering the content item to the second device.

7. The method of claim 1, wherein the content item includes a pay-per-view item or an on-demand item.

8. The method of claim 1, wherein the offer is further based on a preference input by a user associated with the second device.

9. The method of claim 1, wherein the offer includes a preview of the content item.

10. The method of claim 1, wherein the information indicating the acceptance of the offer includes device information identifying the second device.

11. An apparatus comprising:
a processor of a first device; and
a memory coupled to the processor, the memory including instructions executable by the processor to perform operations, the operations including:
sending, from the first device to a server via a first network associated with a wireless service, a registration request, the registration request including a request for receipt of offer messages for multimedia content items at the first device, the offer messages including offers of content items, wherein the sending a registration request comprises sending the registration request to a device associated with a multimedia service provider when purchasing or initializing the first device;
receiving, from a server via the first network, an offer for a content item that is deliverable via a multimedia service of the multimedia service provider to a second device distinct from the first device, wherein the first device and the second device are associated with a particular user, wherein the particular user has access at the second device to a plurality of types television services including a satellite television service, a cable television service and a streaming television service and wherein the content item is selected for the offer based on a type of television service used by the particular user for viewing multimedia content items at the second device, and wherein the offer is responsive to the registration request and wherein the offer is based on current viewing information associated with the particular user;
receiving input indicating an acceptance of the offer; and
causing the first device to send first information indicating the acceptance of the offer via the wireless service to the server responsive to the input, the server configured to send, based on the first information, the content item to the second device according to the type of television service used by the particular user for viewing multimedia content items at the second device.

12. The apparatus of claim 11, wherein the first information indicating the acceptance of the offer is sent responsive to receipt of the input, the input corresponding to selection of a hyperlink of the offer.

13. The apparatus of claim 11, wherein the content item includes a pay-per-view item, a video on demand item, or an audio on demand item.

14. The apparatus of claim 11, wherein the offer includes a preview of the content item.

15. The apparatus of claim 11, wherein the offer is further based on a preference input by a user of the second device.

16. The apparatus of claim 11, wherein the operations further include receiving a confirmation message from the server responsive to sending the first information, wherein the confirmation message acknowledges the acceptance of the offer.

17. A non-transitory computer-readable medium storing instructions executable by a processor to perform operations, the operations comprising:

receiving, from a server via a first network associated with a wireless service at a first device that includes the processor, an offer for a content item that is deliverable via a multimedia service to a second device distinct from the first device, wherein the first device and the second device are associated with a particular user, wherein the particular user has access at the second device to a plurality of types television services including a satellite television service, a cable television service and a streaming television service, wherein the offer is based on a characteristic of use of the second device, wherein the offer is generated by the server responsive to a registration request, the registration request including a request for receipt of offer messages for multimedia content items from the server to the first device, the registration request received by the server from a set-top box associated with the multimedia service for delivering the content item to the second device;

receiving input indicating an acceptance of the offer;

causing the first device to send information indicating the acceptance of the offer via the wireless service to the server responsive to the input, the server configured to send, based on the information, the content item to the second device according to a type of television service used by the particular user for viewing multimedia content items at the second device; and receiving a confirmation message from the server responsive to sending the information, wherein the confirmation message acknowledges the acceptance of the offer.

18. The non-transitory computer-readable medium of claim 17, wherein the confirmation message identifies the content item.

19. The non-transitory computer-readable medium of claim 17, wherein the operations further include receiving a reminder message prior to a broadcast time of the content item.

20. The non-transitory computer-readable medium of claim 17, wherein the characteristic of use is based on current viewing information associated with the second device.

\* \* \* \* \*